April 15, 1952     C. E. HARRIS     2,592,895
TREE HOLDER
Filed Feb. 25, 1950
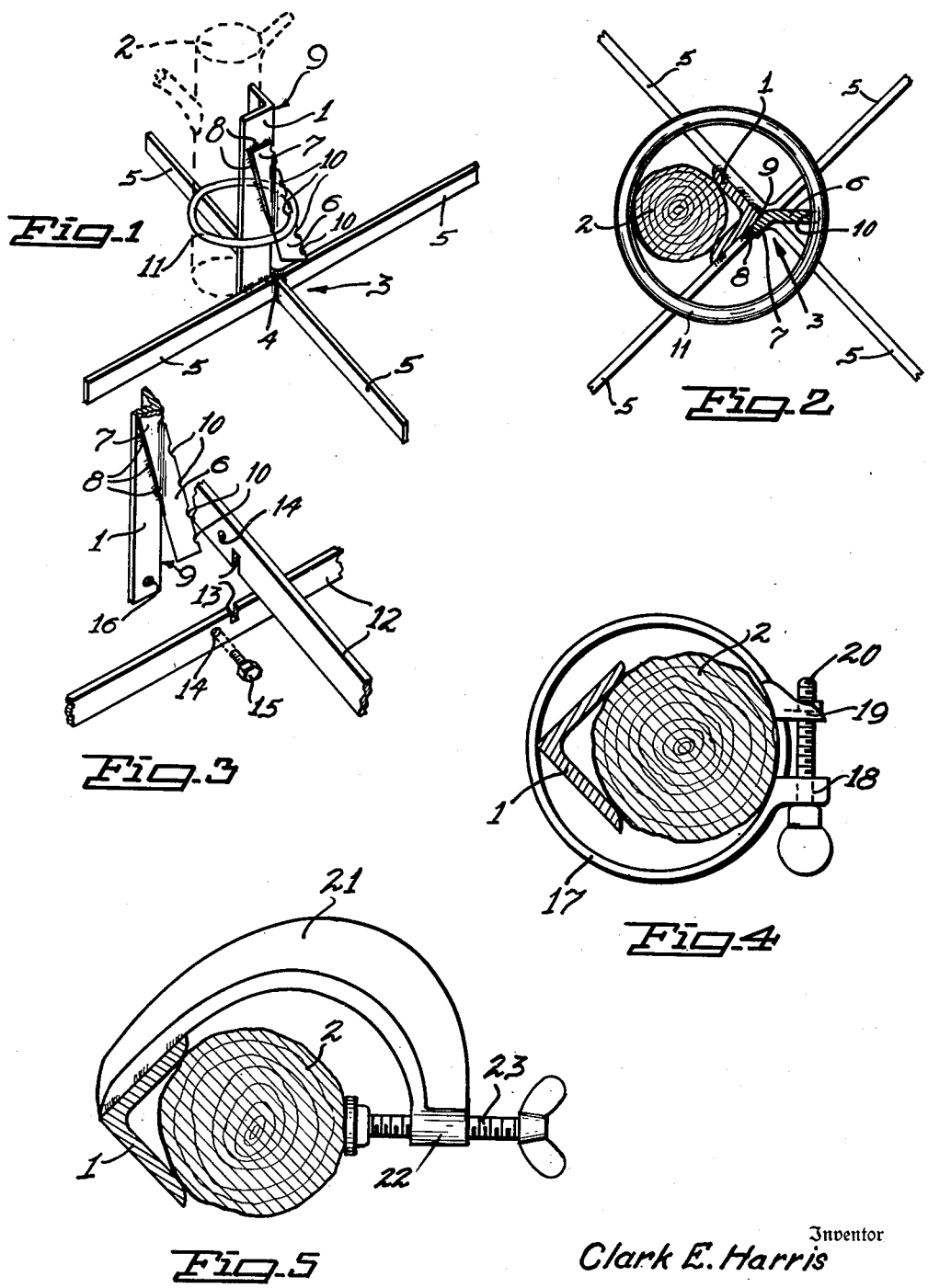
Inventor
Clark E. Harris
By
Glenn S. Fish
Attorney Patented Apr. 15, 1952

2,592,895

UNITED STATES PATENT OFFICE 2,592,895

TREE HOLDER

Clark E. Harris, Spokane, Wash.

Application February 25, 1950, Serial No. 146,243

2 Claims. (Cl. 248—44)

This invention relates to a tree holder and it is one object of the invention to provide a holder by means of which trees of the type used as Christmas trees or as ornamental background for decorations in a room may be very effectively supported in an upright position and prevented from falling over.

Another object of the invention is to provide a tree holder having a standard extending upwardly from a base and so formed that when it is applied to a tree the trunk of the tree will fit into a recess between wings or flanges of the standard and the standard then firmly clamped against the tree trunk, the standard being of such length that the tree will be braced against tilting out of an upright position.

Another object of the invention is to provide the standard with a wedge disposed vertically and extending downwardly at an outward incline so that when a ring is forced downwardly a portion of the ring will engage in recesses formed in the wedge and the ring prevented from slipping upwardly out of a position in which the tree trunk is bound tightly against the standard by the ring.

Another object of the invention is to provide a tree holder wherein a split ring type of clamp may be used for holding the tree trunk in close contacting engagement with the standard or the standard provided with a tree engaging clamp of the type used by carpenters.

Another object of the invention is to provide the tree holder with an improved form of base which is formed of metal bars or strips so connected with each other that they form legs extending in diverging relation to each other and substantially in radiating relation to the standard and of such length that they will serve very effectively to prevent the tree holder from turning over when subjected to the weight of a tree secured against the standard.

The invention is illustrated in the accompanying drawings wherein:

Fig. 1 is a perspective view of the tree holder of the improved construction.

Fig. 2 is a view showing the improved tree holder partially in transverse section and partially in top plan.

Fig. 3 is a perspective view of the elements forming a tree holder having a modified form of base for its standard.

Fig. 4 is a view showing the standard of a tree holder in transverse section and a tree trunk in section and held against the standard by a clamp of the split ring type.

Fig. 5 is a view similar to Figure 4 showing a tree trunk held against the standard by a clamp welded to the standard.

The standard 1 against which the trunk 2 of a tree is secured is formed of strong angle metal and has diverging side flanges which straddle a side portion of the tree trunk transversely thereof when the holder is applied to a tree. In order to support the standard in an upright position there has been provided a base 3 which is formed of metal bars or strips so disposed that they rest upon their lower edge faces. In Figures 1 and 2 the bars or strips forming the base are each bent midway its length to a V-shaped form. The two bent bars or strips are then so disposed that their apexes, or the united ends of their arms, meet in abutting engagement with each other where they are welded together, as shown at 4 and their arms form legs 5 for the base. These legs 5 extend outwardly in diverging relation to each other and when the standard is disposed vertically and its lower end portion welded to side faces of the meeting inner ends of the adjoining arms of the two bars the legs formed by the arms will extend in substantially radiating relation to the standard.

A strip 6 formed of stiff metal is disposed vertically and has its upper portion bent to form a wing 7 which is in such angular relation to the rest of the strip that when this wing is disposed flat against the outer surface of a flange of the standard and secured by welding, as shown at 8, the strip 6 will extend downwardly in diverging relation to the edge 9 of the standard. Therefore the metal strip 6 forms a wedge having its outer edge face spaced from the edge 9 of the standard progressively greater distances towards its lower end. This outer edge face of the wedge 6 is formed with a number of notches or recesses 10 which are spaced from each other longitudinally thereof and are of such size that when a ring 11 is disposed in encircling relation to the standard and a tree trunk and forced downwardly to a position in which it holds the tree trunk in engagement with the rear edges of the wings of the standard, the outer portion of the ring will fit into one of the recesses and this will prevent the ring from slipping upwardly to a position in which it will not have binding engagement with the tree trunk. Therefore the tree trunk will be firmly held against the standard and can not tilt out of an upright position.

Instead of forming the base as shown in Figures 1 and 2 it may be formed as shown in Figure 3 In this figure the base has been shown formed from two bars 12 which have their lower edge faces resting upon the floor. These bars are formed midway their length with notches or slots 13 and when the two bars are disposed as shown in Figure 3 with the notches registering the upper bar may be pressed downwardly and the bars will be held in interlocked engagement with each other and form diverging legs for the base. Each bar is formed with an opening or hole 14 and when screws 15 are passed through the two openings and through threaded openings 16 formed near lower ends of the flanges of the standard, the standard will be firmly held in engagement with the two bars and supported in an upright position perpendicular to the bars. Since the screws may be removed and the bars separated the standard is detachable from the base and the bars forming the base may be taken apart and the standard and the two base-forming bars disposed in side by side relation to each other and stored in a small space until again needed.

In Figure 4 there has been shown a clamp 17 which is of the open ring type. This clamp is used instead of the solid ring and since it is formed with lugs 18 and 19 at opposite sides of its split and a screw 20 is passed through an opening in the lug 18 and into a threaded opening formed in the lug 19 the two lugs may be drawn towards each other and the split ring contracted about the standard and the tree trunk. When this clamp is used a portion may be seated in a notch of the wedge carried by the standard or the wedge may be omitted and the clamp still be tightened about the tree trunk and the standard.

Another form of clamp is shown in Figure 5. This clamp 21 is of the type used by carpenters for holding two boards or other objects together, and the inner end of the body or yoke of the clamp is welded against the outer side face of a flange of the standard. At its outer end the clamp is formed with a sleeve 22 having a threaded opening through which passes a clamping screw 23, and when the screw is tightened the tree trunk will be held in tight binding engagement with flanges of the standard and prevented from tilting out of an upright position.

Having thus described the invention, what is claimed is:

1. A tree holder comprising a base, a standard extending upwardly from said base and V-shaped in cross section for straddling engagement with a side portion of a tree trunk, a vertical strip extending downwardly at an angle away from said standard and secured at its upper end to the standard and constituting a wedge disposed at the opposite side thereof from its tree-trunk engaging surface, said strip being formed with recesses spaced from each other longitudinally thereof, and a ring of a diameter adapting it to fit about a tree trunk and said standard and engage in a selected one of the recesses to releasably hold the ring in a selected recess and bind the tree trunk against the standard.

2. A tree holder comprising a base, a standard extending upwardly from said base and V-shaped in cross section for straddling engagement with a side portion of a tree trunk, a vertical strip extending downwardly at an angle away from said standard and secured at its upper end to the standard and constituting a wedge disposed at the opposite side thereof from its tree-trunk engaging surface, and a ring of diameter adapting it to fit about a tree trunk and the standard and the wedge and bind the tree trunk firmly against the standard.

CLARK E. HARRIS.

REFERENCES CITED

The following references are of record in the file of this patent:

UNITED STATES PATENTS

| Number | Name | Date |
| --- | --- | --- |
| 263,606 | Smith | Aug. 29, 1882 |
| 650,101 | Becker et al. | May 22, 1900 |
| 1,386,947 | Quinn | Aug. 9, 1921 |
| 1,607,358 | Moran | Nov. 16, 1926 |
| 1,733,011 | Healy et al. | Oct. 22, 1929 |
| 2,420,002 | McKay | May 6, 1947 |
| 2,455,404 | Brown et al. | Dec. 7, 1948 |
| 2,500,215 | Swearingen | Mar. 14, 1950 |